(12) United States Patent
Trotter et al.

(10) Patent No.: US 7,708,489 B2
(45) Date of Patent: May 4, 2010

(54) RETAINER AND ASSOCIATED ASSEMBLY

(75) Inventors: Jason K. Trotter, Des Plaines, IL (US); Christopher M. Narveson, Elburn, IL (US); Scott Hamilton Carr, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 679 days.

(21) Appl. No.: 11/131,536

(22) Filed: May 18, 2005

(65) Prior Publication Data

US 2005/0220532 A1 Oct. 6, 2005

Related U.S. Application Data

(63) Continuation-in-part of application No. 10/975,835, filed on Oct. 28, 2004, now abandoned.

(60) Provisional application No. 60/516,820, filed on Nov. 3, 2003.

(51) Int. Cl.
*F16B 9/00* (2006.01)
(52) U.S. Cl. .................. 403/194; 403/195; 403/238
(58) Field of Classification Search .......... 403/326, 403/329, 330, 388, DIG. 7, 194, 195, 238, 403/239, 360, 371; 24/457, 458, 453; 16/2.1; 285/139.1, 140.1; 411/517, 519–521; 174/153 G; 248/56
See application file for complete search history.

(56) References Cited

U.S. PATENT DOCUMENTS

| | | | | |
|---|---|---|---|---|
| 1,192,927 A * | 8/1916 | Mosher | ...................... | 285/215 |
| 2,305,768 A * | 12/1942 | Gente | ...................... | 403/372 |
| 2,327,605 A * | 8/1943 | Ryder | ...................... | 411/352 |
| 2,595,787 A * | 5/1952 | Heimann | ...................... | 411/518 |
| 2,834,620 A * | 5/1958 | Maude | ...................... | 403/254 |
| 3,169,030 A * | 2/1965 | Lippincott | .................. | 285/86 |
| 3,243,206 A * | 3/1966 | Samer | ...................... | 285/154.1 |
| 3,415,155 A * | 12/1968 | Riddell et al. | | |
| 3,548,079 A * | 12/1970 | Wold et al. | ............... | 285/149.1 |
| 4,220,808 A * | 9/1980 | Fujita | | |
| 4,256,010 A * | 3/1981 | Petrie | ...................... | 411/518 |
| 4,364,615 A * | 12/1982 | Euler | ...................... | 267/159 |
| 4,773,280 A * | 9/1988 | Baumgarten | ............... | 403/197 |
| 4,784,418 A * | 11/1988 | Pearson et al. | ............. | 411/525 |
| 4,798,075 A * | 1/1989 | Killian et al. | ............... | 411/517 |
| 4,813,808 A * | 3/1989 | Gehrke | ...................... | 403/326 |
| 4,840,585 A * | 6/1989 | Muzslay | ................. | 174/153 R |
| 5,068,771 A * | 11/1991 | Savage, Jr. | | |
| 5,322,466 A * | 6/1994 | Bolli et al. | | |
| 5,810,272 A * | 9/1998 | Wallace et al. | ............. | 403/329 |
| 6,095,910 A * | 8/2000 | Luedeke | .................... | 451/359 |
| 6,116,807 A * | 9/2000 | Dzurko et al. | ............... | 403/329 |

(Continued)

FOREIGN PATENT DOCUMENTS

DE 19904713 C1 * 3/2000

(Continued)

*Primary Examiner*—Victor MacArthur
(74) *Attorney, Agent, or Firm*—Mark W. Croll; Paul F. Donovan

(57) ABSTRACT

A pivot assembly includes a support defining a hole, a pivot insert disposed in the hole and a retainer securing the pivot insert in the hole. The pivot insert defines a circumferential groove, and the retainer is a ring having inwardly directed fingers for engagement in the groove.

15 Claims, 4 Drawing Sheets

U.S. PATENT DOCUMENTS

| | | |
|---|---|---|
| 6,213,677 B1 * | 4/2001 | Yamane et al. ............... 403/329 |
| 6,561,720 B2 * | 5/2003 | Wirth et al. ................. 403/297 |
| 6,689,954 B2 * | 2/2004 | Vaughan et al. |
| 6,932,227 B1 * | 8/2005 | Glenn .................... 403/408.1 |
| 7,389,798 B2 * | 6/2008 | Nowling et al. |
| 2002/0031400 A1 * | 3/2002 | Schwarz .................... 403/329 |
| 2006/0093429 A1 * | 5/2006 | Trotter et al. ............... 403/165 |

FOREIGN PATENT DOCUMENTS

| | | | |
|---|---|---|---|
| EP | 1026044 A1 | * | 8/2000 |
| JP | 10196623 A | * | 7/1998 |
| JP | 2000120632 A | * | 4/2000 |

* cited by examiner

RETAINER AND ASSOCIATED ASSEMBLY

CROSS-REFERENCE TO RELATED APPLICATIONS

The present United States Patent Application is a continuation-in-part of U.S. patent application Ser. No. 10/975,835, filed on Oct. 28, 2004 now abandoned which claims the benefits of U.S. Provisional Application Ser. No. 60/516,820, filed on Nov. 3, 2003.

FIELD OF THE INVENTION

The present invention relates generally to retainers, and particularly plastic retainers, and, more specifically, the present invention pertains to plastic retainers adapted for pivoting assemblies such as hip pivots used in furniture.

BACKGROUND OF THE INVENTION

Pivoting assemblies are known for use in many different structures. So called "hip pivots" are known for use in furniture and the like and generally include a bracket that can be secured to a frame and a swivel-type insert in a part of the bracket for rotatable securement relative to another structure. It is known to connect chair seats and back rests to the chair frame using pivoting assemblies, to provider greater comfort by changing the angular orientation of the seat or back.

A known pivoting assembly includes a frame member commonly of metal, a cover commonly of plastic, a pivot retainer commonly also of plastic and a snap ring of steel for securing the device. The frame and cover are appropriately configured to receive the pivot retainer. The pivot retainer is snap fit into the associated structures of the frame and cover. A snap ring is positioned into a groove in the pivot retainer, to secure the pivot retainer in place. Snap ring pliers or a similar tool is required to spread the snap ring for sliding over the pivot retainer and into the groove. When properly positioned, the snap ring is released to engage within the groove.

An assembly of this type has a number of drawbacks or disadvantages. Snap rings are cumbersome and sometimes difficult to install. The snap ring must be spread and aligned with the groove in which it will be secured prior to being released. If not properly aligned with the groove, the snap ring may not seat properly in the groove and can become disengaged from its locking position. Further, known snap rings are metal and therefore subject to corrosion, which can result in failure or potentially staining fabric or other materials used on a chair in which the hip pivot is installed. Still further, the groove and associated surface that receives the snap ring, as well as other snap together surfaces, do not provide large support surfaces. Accordingly, the pivot retainer may become disengaged from the associated apparatus and side from its intended position.

What is needed in the art is a retainer for a pivot assembly that is easy to install and secure when installed. Preferably the retainer should be of plastic or other inexpensive material not subject to corrosion.

SUMMARY OF THE INVENTION

The present invention provides a retainer for a pivoting assembly that can be made of plastic and that engages in a snap fit manner, being pushed axially into position by hand or with simple tools.

In one aspect thereof, the present invention provides a pivot assembly with a support defining a hole, a pivot insert and a retainer. The pivot insert includes a body having a head and a lead end. The head engages the support and the lead end defines a groove. The retainer has a ring and fingers directed inwardly from the ring. The fingers are seated in the groove, with the body in the hole and the head and the retainer disposed against opposite surfaces of the support.

In another aspect thereof, the present invention provides a method of assembling a pivot assembly in a support having a hole, with steps of providing a pivot insert having a tubular body with a head at one and a groove near an opposite end of the body; placing the end of the body with the groove into the hole of the support and inserting the body until the head substantially engages the support on the first surface; providing a retainer with a ring and fingers projecting inwardly from the ring; placing the retainer around the body and pushing the retainer axially on the body until the fingers of the retainer are received in the groove of the body and the retainer is disposed substantially against the second surface of the support.

In a still further aspect thereof, the present invention provides a retainer for substantially tubular body in a hole, the body having a groove. The retainer has a ring, fingers projecting inwardly from the ring, and at least one leg projecting axially from a surface of the ring.

An advantage of the present invention is providing a retainer that is non-corrosive and strong.

Another advantage of the present invention is providing a retainer for a pivoting assembly that can be fastened easily and quickly by hand or with simple tools.

Still another advantage of the present invention is providing a retainer for a hip pivot that can be made of plastic or other inexpensive material.

Other features and advantages of the invention will become apparent to those skilled in the art upon review of the following detailed description, claims and drawings in which like numerals are used to designate like features.

Figure 1:
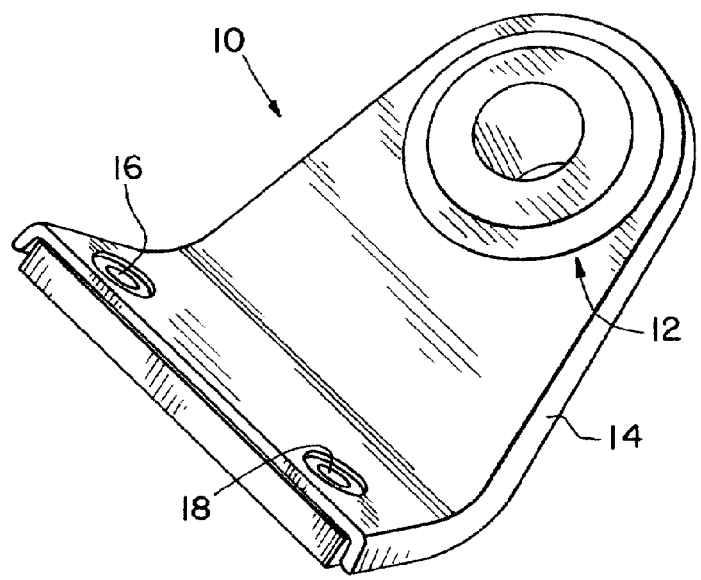
FIG. 1 is a perspective view of a pivot assembly in accordance with the present invention.
Figure 2:
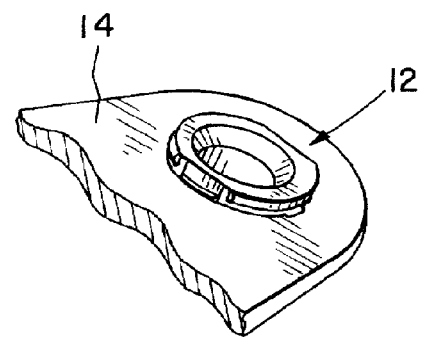
FIG. 2 is a fragmentary view of the pivot assembly shown in FIG. 1, illustrating the side opposite the side shown in FIG. 1.
Figure 3:
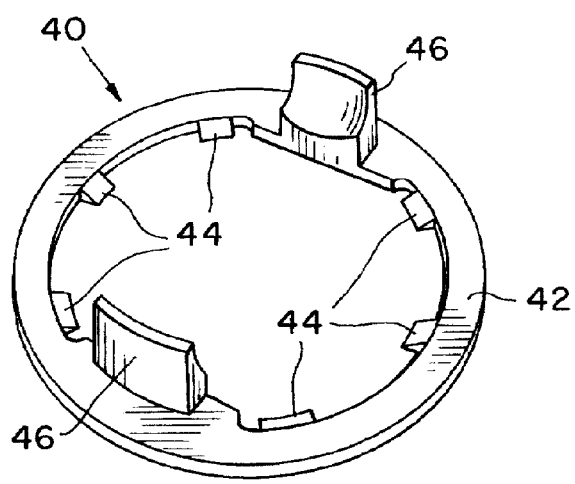
FIG. 3 is a perspective view of a retainer used in the pivot assembly in accordance with the present invention.
Figure 4:
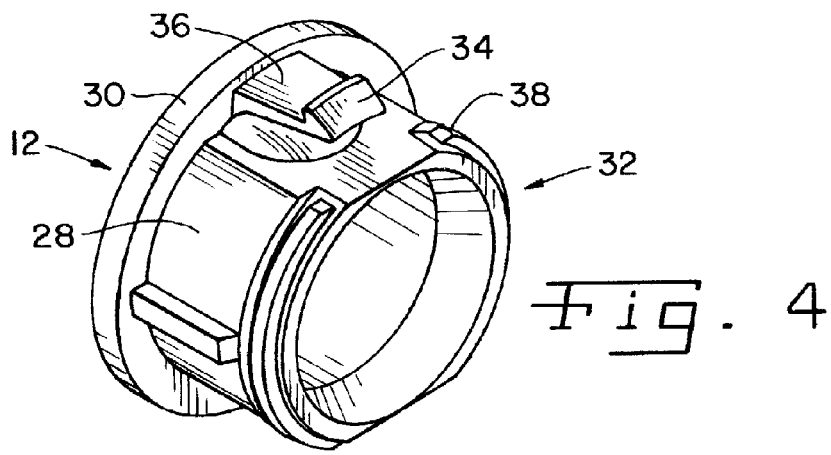
FIG. 4 is a perspective view of the pivot portion of the pivot assembly.
Figure 5:
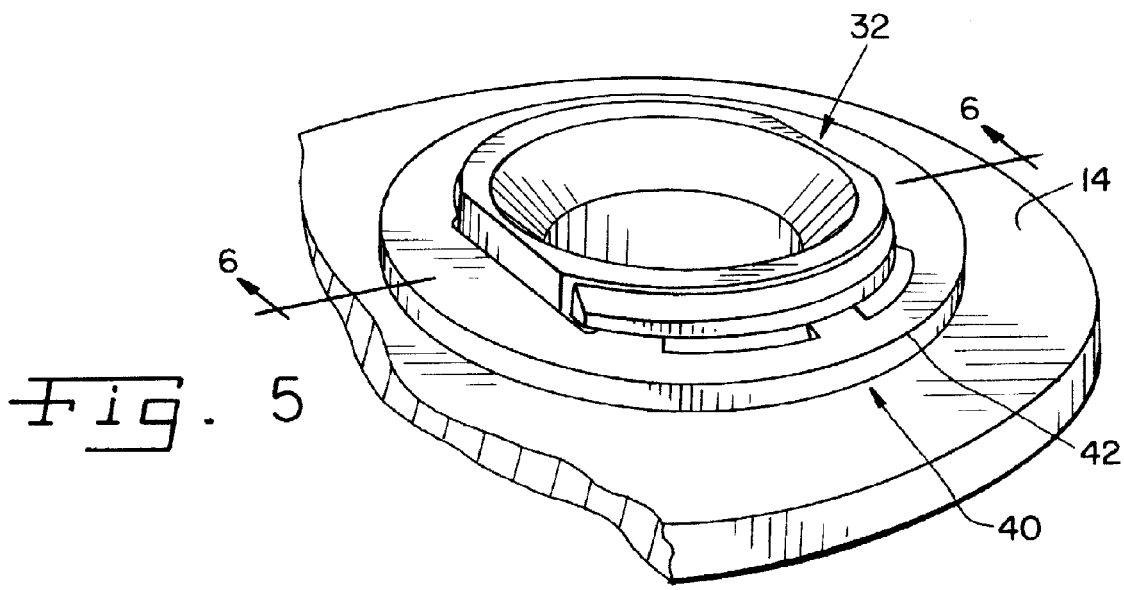
FIG. 5 is an enlarged, fragmentary of a pivot assembly of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a pivot assembly in accordance with the present invention. Pivot assembly 10 includes a pivot insert 12 secured in a support 14. It should be understood that pivot assembly 10 of the present invention can be used in a variety of different structures or devices. Assembly 10 illustrated herein, suitable, for example, as a hip pivot of a chair, is merely one such structure in which the invention can be used advantageously.

Support 14 of the exemplary embodiment is an L-shaped bracket having anchor holes 16, 18 by which support/bracket 14 can be secured to another device or structure. Fasteners (not shown) can be used in anchor holes 16 and 18 for attaching support 14 to a chair frame (not shown), for example, and pivot insert 12 can be used for securing a back rest and/or seat of a chair to allow pivotal rotation of the seat/backrest relative to the frame. Support 14 further defines a hole 20 for receiving pivot insert 12. Within hole 20, support 14 defines a plurality of notches 22 near one end of hole 20. Hole 20 extends through support 14 and has openings thereto in both a first surface 24 and a second surface 26 of support 14. Support 14 can be made of metal, including aluminum, or of plastic or other suitable materials.

Pivot insert 12 includes a generally tubular body 28 configured to be inserted into hole 20, and includes a head 30 at one end of body 28 opposite a lead end 32 of body 28. Lead end 32 is the first portion of pivot insert 12 to be inserted into hole 20 during assembly, and pivot insert 12 is inserted into hole 20 until head 30 engages a first surface 24 of support 14.

One or more outwardly projecting tab 34 is provided at the distal end of one or more arm 36 extending substantially axially from head 30 toward lead end 32, outwardly of tubular body 28. Tabs 34 are provided in appropriate numbers and positioned about the circumference of head 30 to engage notches 22 in hole 20. Two arms 36 having tabs 34 are provided for the two notches 22 illustrated in the exemplary embodiment; however, more or fewer notches 22, tabs 34 and arms 36 can be used. Arms 36 can deflect inwardly as pivot insert 12 is inserted into hole 20 and tabs 34 slide along hole 20. Arms 36 rebound outwardly when tabs 34 align with notches 22, moving tabs 34 into notches 22. Thus, a snap-fit engagement is provided with tabs 34 in notches 22, to secure pivot insert 12 in hole 20 of support 14.

Lead end 32 extends beyond second surface 26 in the assembled structure of pivot assembly 10. Lead end 32 defines an external groove 38, which may be formed as an annular recess in the surface of body 28, or as the space behind an annular, outwardly projecting ring on the surface of body 28.

A retainer 40 is provided to secure the position of lead end 32 relative to second surface 26 of support 14. Retainer 40 can be made of a variety of materials, including plastic and metal, and has a substantially washer-like ring 42 of greater diameter than hole 20 at second surface 26. A plurality of fingers 44 project substantially radially inwardly from annular ring 42 and are received in groove 38 in the assembled pivot assembly 10. Thus, in the assembled structure, pivot 12 is secured firmly to support 14, with head 30 disposed against first surface 24 and retainer 40 connected to body 28 at lead end 32 and disposed against second surface 26.

Figure 6:
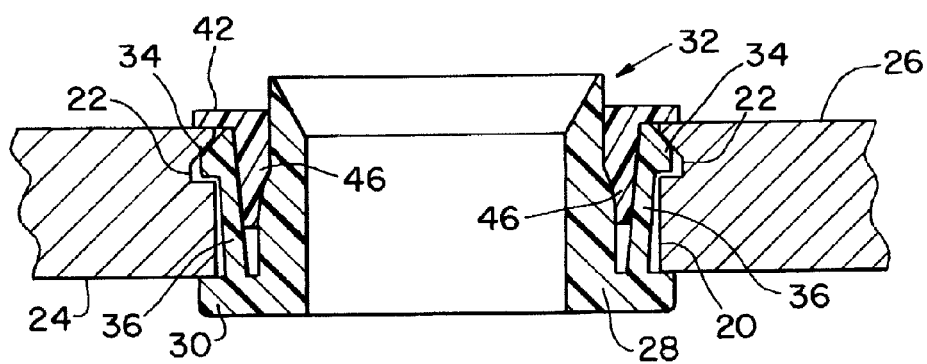
FIG. 6 is a cross-sectional view of the assembly shown in FIG. 5, take along line 6-6 of FIG. 5.

Retainer 40 further includes one or more leg 46 projecting substantially axially from a same side of annular ring 42, near the inner part thereof. As best seen in FIG. 6, the exemplary embodiment includes two legs 46 positioned inwardly of arms 36 and tabs 34 in the assembled pivot assembly 10. A leg 46 can be provided for each arm 36 and tab 34, or for less than all arms 36 and tabs 34 to prevent radially inward deflection of some or all tabs 34 and arms 36 following attachment of retainer 40. Thus, legs 46 of retainer 40 lock tabs 34 in notches 22, substantially restricting unintended dislodgement of tabs 34 from notches 22 and improving the security of the attachment of pivot insert 12 to support 14.

During assembly of pivot assembly 10, pivot insert 12 is inserted into hole 20 with tabs 34 aligned axially with notches 22. As lead end 32 enters hole 20 from first surface 24, tabs 34 encounter the edge of first surface 24 at hole 20, and arms 36 and tabs 34 are deflected inwardly. Tabs 34 slide along the inner surface of hole 20 until tabs 34 are radially aligned with notches 22. Arms 36 and tabs 34 spring outwardly, engaging tabs 34 in notches 22 as head 30 is pressed against first surface 24.

To complete the assembly, retainer 40 is positioned onto body 28, with ring 42 surrounding lead end 32 and legs 46 in axial alignment with arms 36. Retainer 40 is pushed axially along body 28 until fingers 44 are received in groove 38, locking retainer 40 in position. As illustrated in FIG. 6, ring 42 is disposed against second surface 26, and legs 46 are positioned between arms 36 and body 28 to prevent inward movement of tabs 34, thereby locking tabs 34 in notches 22.

Figure 7:
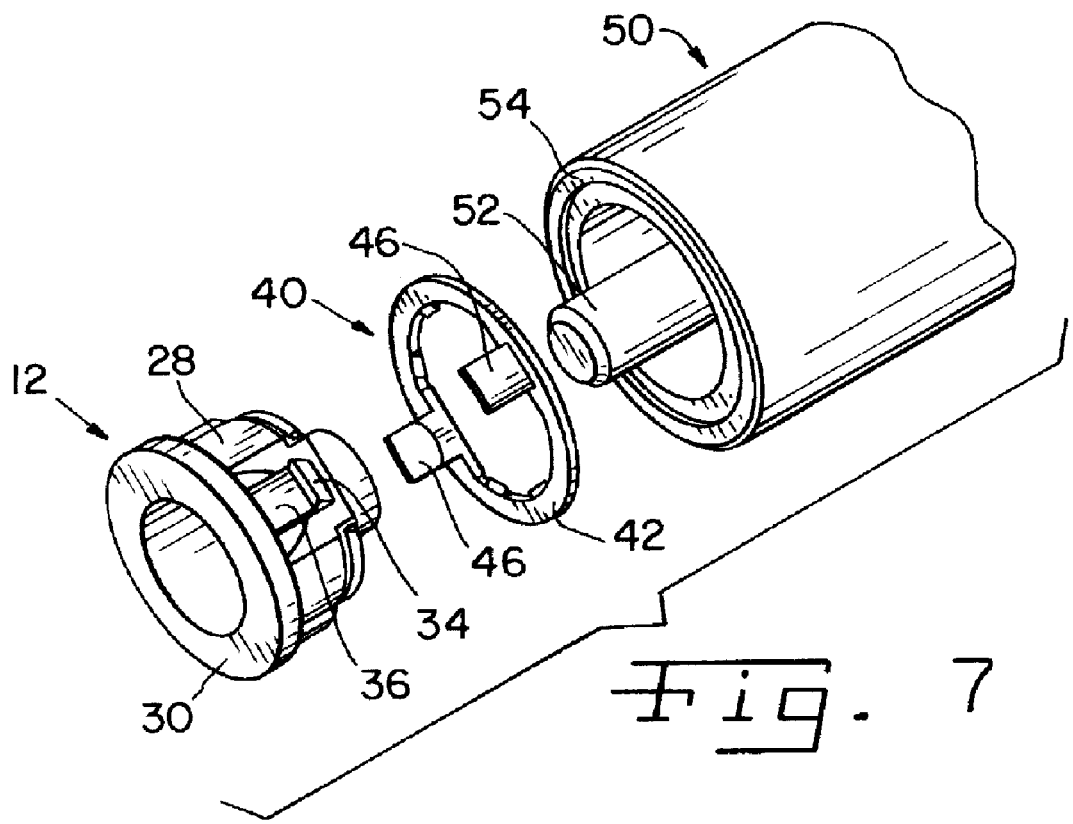
FIG. 7 is an exploded perspective view illustrating use of a tool for assembling the present invention.

The installation of retainer 40 can be performed by hand or by using a tool 50 as shown in FIG. 7. Tool 50 includes a center probe 52 and an annular barrel 54. Barrel 54 provides equal force against annular body 40 to move retainer 40 axially along body 28, with probe 52 positioned within body 28.

Figure 8:
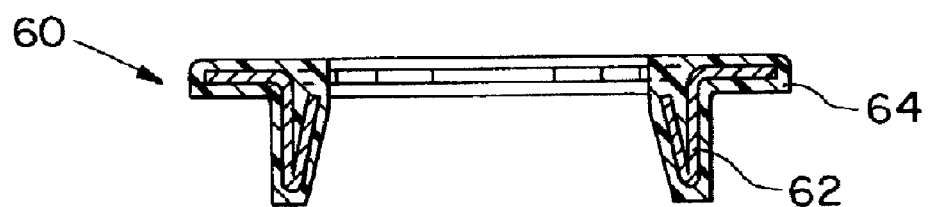
FIG. 8 is a cross-sectional view of a modified form of a retainer in accordance with the present invention.

When the strength of metal is desired along with anti-corrosive properties, non-corroding metals can be used for retainer 40. However, to provide a less expensive retainer, a coated structure can be used. FIG. 8 illustrates an embodiment of a retainer 60 in which a center core 62 of metal is covered with a plastic coating 64. A variety of coatings can be used, including overmolded plastic, paint and other film applied coatings. Retainer 60 is used and functions similarly to retainer 40.

Figure 9:
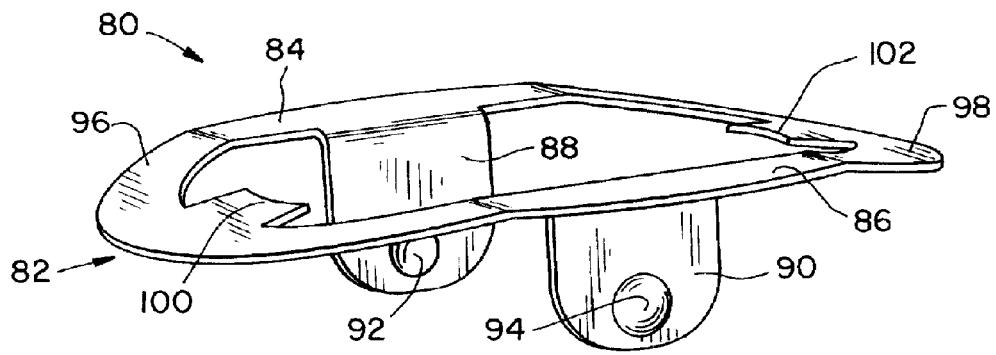
FIG. 9 is a perspective view of another modified form of a retainer in accordance with the present invention.

FIG. 9 illustrates another embodiment of a retainer 80 in accordance with the present invention. Retainer 80 includes a ring 82 having substantially parallel opposed side portions 84, 86 from which legs 88 and 90 depend. Dimples 92, 94 in the inwardly facing surfaces of legs 88 and 90 protrude outwardly from the outer surfaces of legs 88 and 90, respectively. Connecting portions 96 and 98 extend between parallel side portions 84 and 86 on opposite sides of retainer 80. Connecting portions 96, 98 are bent downwardly from side portions 84, 86 on the same side of retainer 80 as legs 88 and 90. Thus, in the orientation shown in FIG. 9, legs 88 and 90 extend downwardly from side portions 84, 86 and connecting portions 96, 98 are bent downwardly relative to side portions 84 and 86. Fingers 100 and 102 are provided on connecting portions 96, 98 respectively and project inwardly in ring 82.

Figure 10:
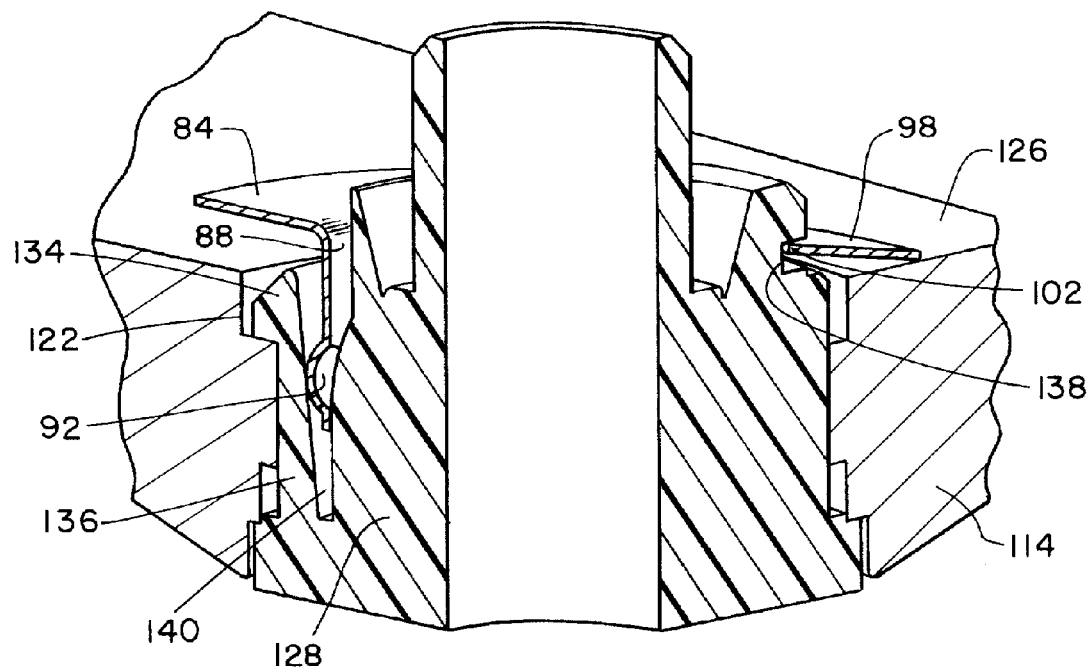
FIG. 10 is a cross-sectional view of a pivot assembly using the retainer shown in FIG. 9.

As illustrated in FIG. 10, retainer 80 is installed similarly to retainer 40 as shown and described previously herein. However, bent connecting portions 96 and 98 impart spring resistance of retainer 80 against and between a body 128 and a support bracket 114. Fingers 100, 102 are received in a groove 138, and bent connecting portions 96 and 98 are compressed against a second surface 126 opposite to the natural bend of connecting portions 96 and 98, thereby imparting a spring force or natural resiliency throughout the assembly. Legs 88 and 90 with dimples 92 and 94 more completely fill a space 140 between an arm 136 and body 128 to wedge and secure a tab 134 in a notch 122. With fingers 100, 102 projecting inwardly at the angle provided by downwardly bent connecting portions 96 and 98, the angular inward orientation of fingers 100 and 102 provide a more secure, less easily dislodged retention in groove 138. Further, the angular orientation of retainer 80 provides a lead angle as the retainer is pressed into the assembly.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A pivot assembly comprising:
a support defining a hole;
a pivot insert including a body having a head and a lead end, said head engaging said support, and said lead end defining a groove, said pivot insert including tabs engaging said support; and
a retainer having a ring and fingers directed inwardly from said ring, said fingers being seated in said groove, said body being in said hole, said head and said retainer respectively disposed at opposite surfaces of said support, said retainer having arms projecting substantially axially from said ring, and positioned between said tabs and said body.

2. The pivot assembly of claim 1, said retainer being plastic.

3. The pivot assembly of claim 1, said retainer being metal covered with a coating.

4. The pivot assembly of claim 1, said arms having dimples on inner surfaces thereof projecting outwardly from outer surfaces thereof.

5. A pivot assembly comprising:
a support defining a hole;
a pivot insert including a body having a head and a lead end, said head engaging said support, and said lead end defining a groove, said pivot insert including tabs engaging said support; and
a retainer having a ring and fingers directed inwardly from said ring, said fingers being seated in said groove, said body being in said hole and said head and said retainer respectively disposed at opposite surfaces of said support, said ring including portions bent in the direction of said support, and said retainer having arms extending axially from said ring and positioned between said tabs and said body.

6. The pivot assembly of claim 5, said retainer being metal covered with a coating.

7. The pivot assembly of claim 5, said pivot insert having arms extending axially from said head, said arms including said tabs.

8. A pivot assembly comprising:
a support defining a hole;
a pivot insert including a body having a head and a lead end, said head engaging said support, and said lead end defining a groove, said pivot insert including tabs engaging said support;
a retainer having a ring and fingers directed inwardly from said ring, said fingers being seated in said groove, said body being in said hole, said head and said retainer respectively disposed at opposite surfaces of said support; and
at least one leg projecting substantially axially from a surface of said ring, said at least one leg having at least one dimple therein.

9. The pivot assembly of claim 8, wherein said at least one leg includes two legs projecting substantially axially from the same surface of said ring.

10. The pivot assembly of claim 9, each leg of said two legs having a dimple therein.

11. The pivot assembly of claim 9, said ring having first and second planar portions on an opposite side thereof, with one said leg projecting from each said planar portion on a same side of said ring; and first and second connecting portions between said first and second planar portions, said first and second connecting portions being angularly disposed with respect to said planar portions, and said connecting portions being bent toward said same side of said ring from which said legs project.

12. The pivot assembly of claim 9, said retainer being metal with a surface coating thereon.

13. The pivot assembly of claim 8, said retainer being plastic.

14. The pivot assembly of claim 8, said retainer being metal with a surface coating thereon.

15. A pivot assembly comprising:
a support defining a hole;
a pivot insert including a body having a head and a lead end, said head engaging said support, and said lead end defining a groove;
a retainer having a ring and fingers directed inwardly from said ring, said fingers being seated in said groove, said body being in said hole, said head and said retainer respectively disposed at opposite surfaces of said support; and
at least one leg projecting substantially axially from a surface of said ring, said ring having at least one planar portion and a second portion angularly disposed with respect to said planar portion, said angular portion being bent toward a side of said ring from which said at least one leg projects.

* * * * *